No. 606,764. Patented July 5, 1898.
F. A. LUNDQUIST.
TELEPHONE EXCHANGE.
(Application filed May 19, 1897.)
(No Model.) 3 Sheets—Sheet 1.

WITNESSES:
Howard A. Redfield
D. A. Mahony

INVENTOR:
Frank A. Lundquist
By Casper L. Redfield
ATTORNEY.

No. 606,764. Patented July 5, 1898.
F. A. LUNDQUIST.
TELEPHONE EXCHANGE.
(Application filed May 19, 1897.)

(No Model.) 3 Sheets—Sheet 2.

WITNESSES:
Howard A. Redfield
B. A. Mahony

INVENTOR:
Frank A. Lundquist
BY Casper L. Redfield
ATTORNEY.

THE NORRIS PETERS CO., PHOTO-LITHO., WASHINGTON, D. C.

No. 606,764. Patented July 5, 1898.
F. A. LUNDQUIST.
TELEPHONE EXCHANGE.
(Application filed May 19, 1897.)
(No Model.) 3 Sheets—Sheet 3.
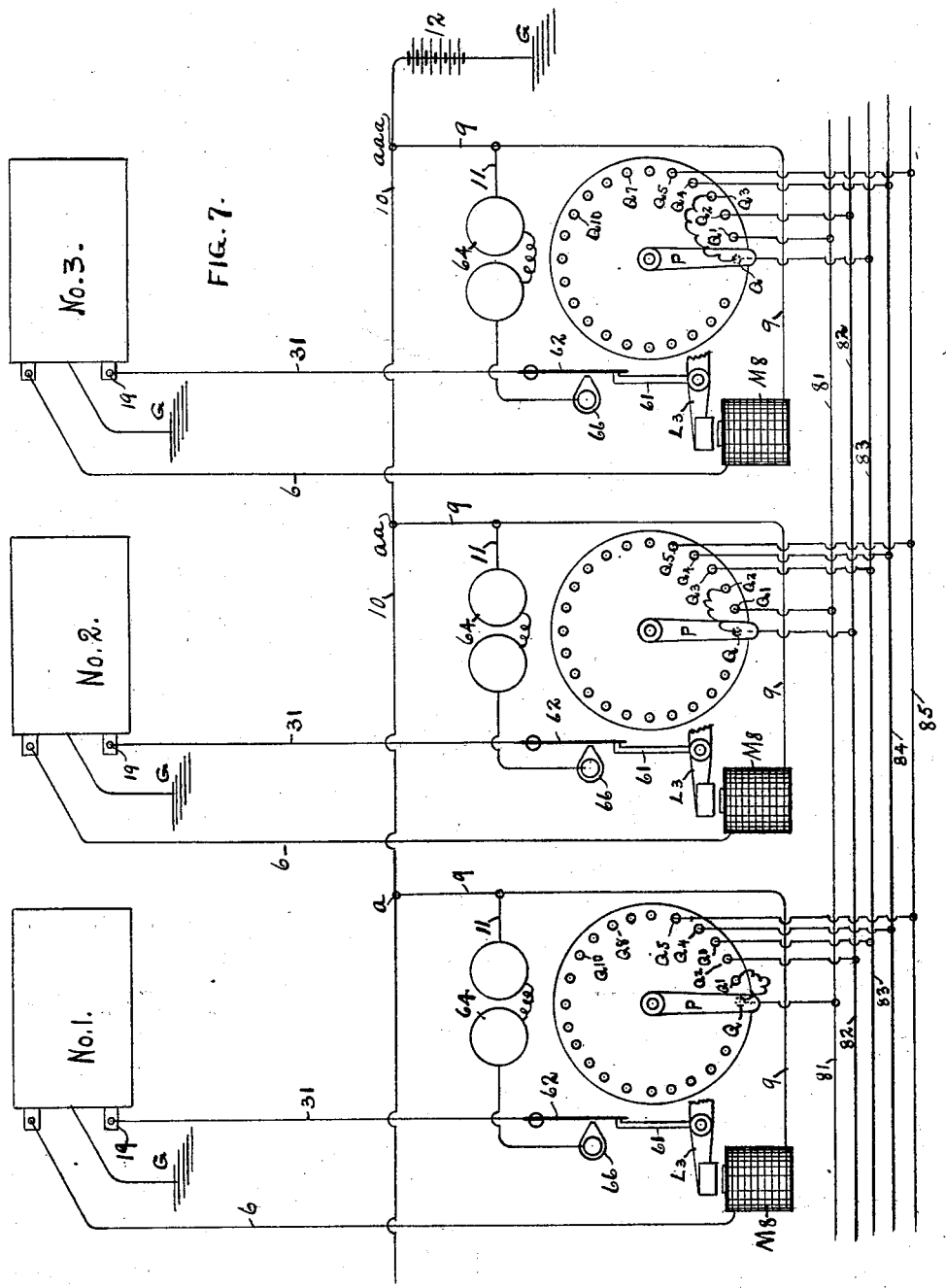
WITNESSES:
Howard A. Redfield
B. A. Mahony
INVENTOR
Frank A. Lundquist
BY Casper L. Redfield
ATTORNEY.

UNITED STATES PATENT OFFICE.

FRANK A. LUNDQUIST, OF CHICAGO, ILLINOIS, ASSIGNOR OF TWO-THIRDS TO JOHN ANDERSON, OF SALINA, AND GUSTAF A. ANDERSON, OF LINDSBORG, KANSAS.

TELEPHONE-EXCHANGE.

SPECIFICATION forming part of Letters Patent No. 606,764, dated July 5, 1898.

Application filed May 19, 1897. Serial No. 637,209. (No model.)

*To all whom it may concern:*

Be it known that I, FRANK A. LUNDQUIST, a citizen of the United States, residing at Chicago, in the county of Cook and State of Illinois, have invented certain new and useful Improvements in Telephone-Exchanges, of which the following is a specification.

My invention is illustrated in the accompanying drawings, in which—

Figure 1:
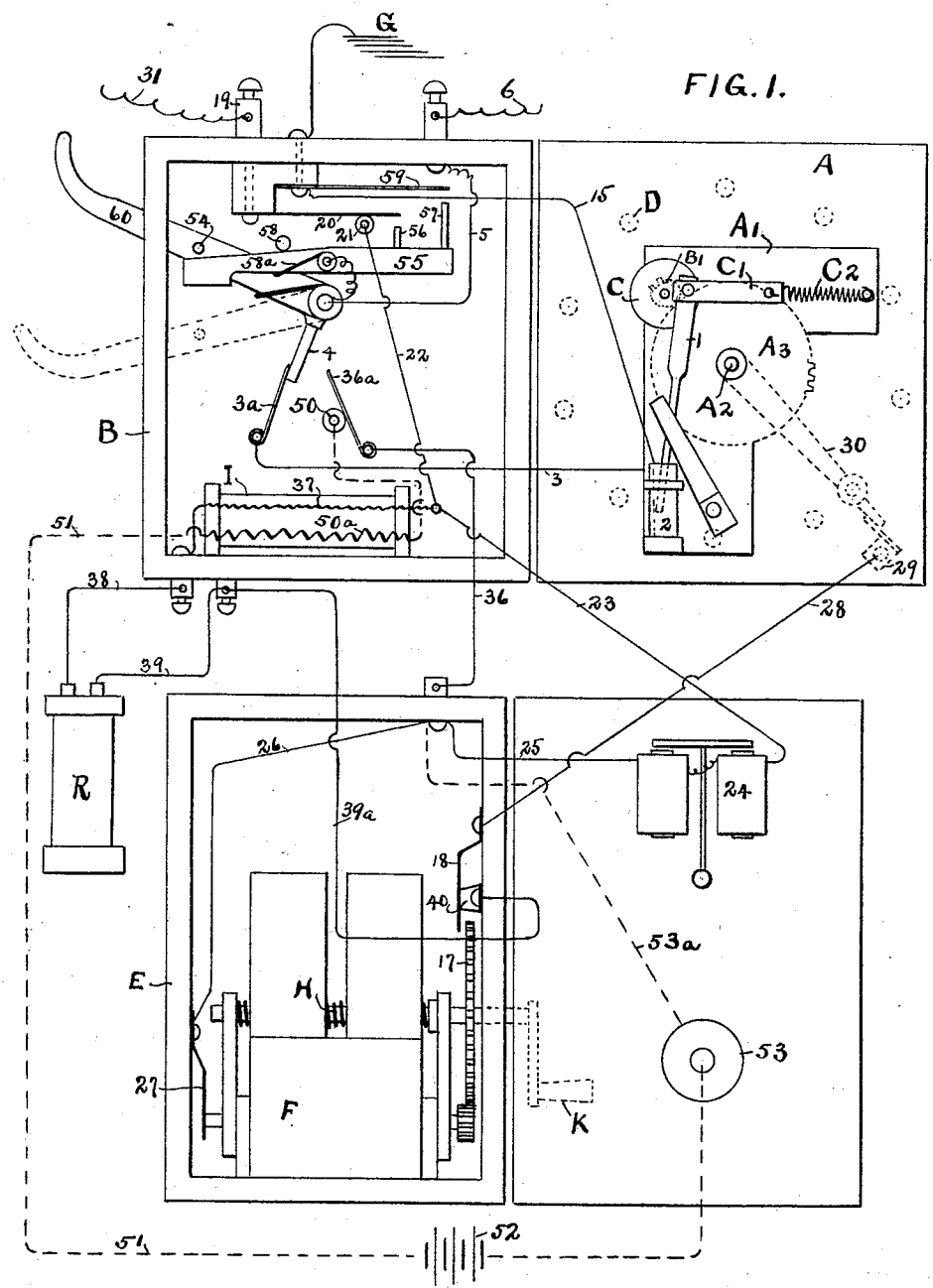
Figure 2:
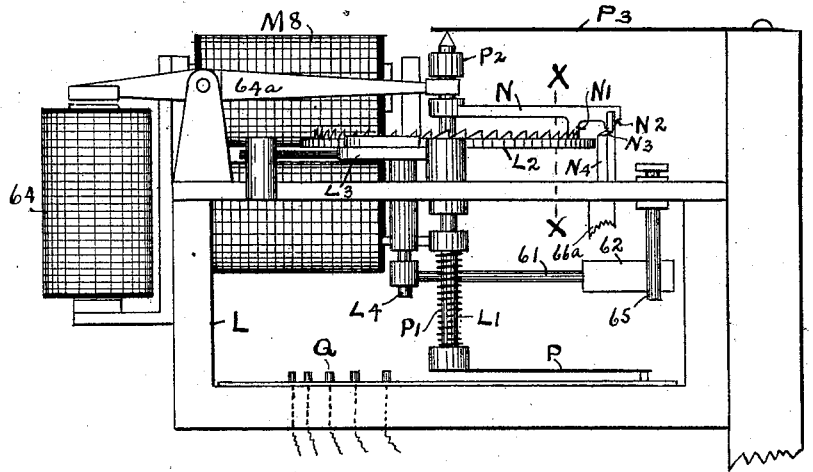
Figure 3:
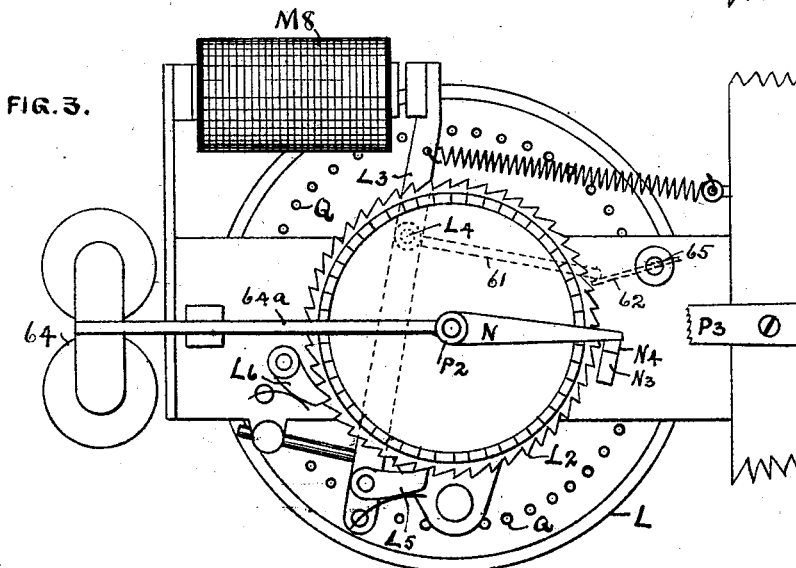
Figure 5:
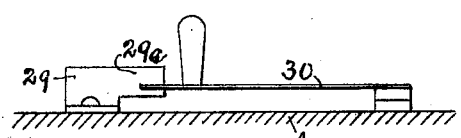
Figure 6:
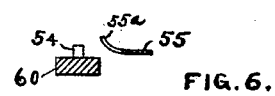
Figure 4:
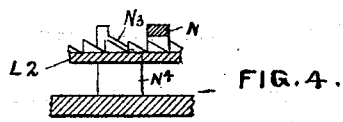

Figure 1 shows the telephone-boxes open and the electrical connections thereto. Figs. 2 and 3 are respectively a side elevation and a plan of the switching mechanism. Fig. 4 is a partial section on line X X of Fig. 2. Figs. 5 and 6 are details, and Fig. 7 is a diagram showing the connections between the telephones and the switching mechanism.

In the said drawings the cover A of the box B has secured to it a metallic frame A′, which carries a spindle $A^2$, to which is secured a gear $A^3$ on the inside of the cover and a crank-arm 30 on the outside. The gear $A^3$ engages a small pinion B′, secured to the same spindle with the crank C, to which is connected the pitman 1, that projects down into a mercury-receptacle 2. Also connected to the crank C is a link C′ and a spring $C^2$, which acts to hold the crank in the position shown in the drawings and resist by a moderate force the action of turning. It will be evident that every time the crank C is turned it will have a tendency to stop in the position shown in Fig. 1 and also that each revolution of the crank C will move the arm 30 a definite distance. By making the gear $A^3$ ten times the diameter of the pinion B′ on the spindle with the crank C the arm 30 will stop at ten points in its revolution, which points are illustrated by the dotted circles D. One of these points is called the "normal," and near it is located a contact 29, so placed that the spring $C^2$ will have a tendency to keep the lever 30 against it when pushed to the normal position. It will be evident that turning the arm 30 by hand will cause the pitman 1 to be plunged into the mercury 2 as many times as the arm 30 passes points D, and that a complete revolution will make ten contacts between the plunger 1 and the mercury 2. The arm 30 (see Fig. 5) is of flexible and resilient material, and the bracket or contact 29 has a projection $29^a$, which is cut away beneath, so that the arm 30 may pass it when depressed. Near the lever 60 for supporting the receiver R is another lever 55, which is held against a stop 58 by a spring $58^a$. The lever 55 is flexible and is provided with a curved lip $55^a$, Fig. 6, which permits the pin 54 on the lever 60 to pass under it into the position shown in Fig. 1 when the receiver R is removed. When the receiver is again hung up, the lever 60 in descending causes the pin 54 to tilt the lever 55 until it slips off and returns to normal position. On the rear end of lever 55 is a pin 56, that upon tilting of the lever 55 comes into contact with the spring 20, that is connected to the binding-post 19. This contact between pin 56 and spring 20 breaks the electrical connection between 20 and the post 21 and completes it between 55 and 19. Simultaneously with the contact between pin 56 and spring 20 there is another contact between a pin 57 (also on lever 55) and a spring 59, that is connected by wire to ground G. Connected to the lever 60 is an arm 4, that comes into contact with the spring $3^a$ when the receiver is removed from its hook and in contact with another spring $36^a$ when the receiver is hung up. Located near $36^a$ is a contact-point 50, which is in electrical contact with $36^a$ when the hook 60 is up, but which contact is broken when the arm 4 comes into contact with spring $36^a$.

In the lower part of the box B is the ordinary induction-coil I, in which $50^a$ represents the primary coil and 37 the secondary. In the box E is a generator F, that is operated by a crank K and gear 17. A spring H keeps the gear 17 and crank K in the position shown; but they may be pushed to the left by hand when a contact is made between gear 17 and spring 18 and broken between 18 and the point 40. The ringer 24 and the transmitter 53 are shown attached to the cover of the box E.

For each telephone in use there is at a central station a frame L, supporting a spindle L′, upon which is loosely mounted a spur and crown toothed ratchet-wheel $L^2$. A lever $L^3$, secured to a spindle $L^4$, and a magnet M⁸ serve to rotate the ratchet-wheel L² by means of the pawl L⁵. Another pawl L⁶ serves to keep the wheel L² from backward movement. Secured to the spindle L' is an arm N, provided with a tooth or projection N', adapted to engage the crown-teeth of the wheel L², and a second projection N², similar to N', adapted to engage the incline N³ of the stopping-post N⁴ to lift the projection N' from the teeth of the wheel L². This contact between N² and N³ takes place only in event of a complete revolution of the arm N. Secured to the lower end of the spindle L' is a pointer P, adapted to come into successive contact with the contact-points Q, the spacing of which corresponds to the spacing of the teeth on the wheel L². One of the contacts Q is considered at the normal, and the pointer P is adjusted on the spindle L', so as to be at the normal position when the arm N is in contact with the post N⁴, as shown. Every time an electric current is sent through the magnet M⁸ it serves to rotate the wheel L² one tooth and to turn the pointer P, by means of the arm N and spindle L', from one point Q to the next one. A spring P' serves to return the pointer P again to normal when the arm N is released from contact with the wheel L² by the magnet 64, acting through the arm 64ᵃ, that engages a collar P² on the spindle L', to lift it, and consequently the arm N. A spring P³ serves to again depress the spindle L' when the magnet 64 ceases to act. Located at a convenient point is an insulated binding-post 65, to which is attached a spring-contact 62. An arm 61, secured to the lever L³, holds this spring normally from engagement with a contact-point 66, (see Fig. 7,) which is supported by and insulated from a post 66ᵃ. (Shown broken off in Fig. 2.) When a current acts upon magnet M⁸ to move its armature, the arm 61 is withdrawn from the spring 62 and permits it to come into contact with the point 66. The electrical connections at each station are illustrated in Fig. 1, and the connections between each telephone and the central station are illustrated diagrammatically in Fig. 7, in which there are represented three telephones, designated, respectively, Nos. 1, 2, and 3. Each telephone is connected directly to its own switch at the central, which switches are arranged in order, as shown. Near the said switches are a series of conductors 81 82 83, &c. At the normal contact-point, which is indicated by Q in Fig. 7, there is a connection from the switch of telephone No. 1 to conductor 81, from No. 2 to 82, from No. 3 to 83, and from No. 4 it would be to 84, and so on. The first contact-point beyond Q is marked Q', the second Q², the third Q³, and so on. In the first switch there is a connection from Q to Q', in the second switch from Q to Q², and so on. There is also a connection at each switch from Q' to 81, from Q² to 82, from Q³ to 83, and so on, except that there is none from Q' at the first switch, from Q² at the second, and so on.

To illustrate the operation, it will be assumed that subscriber at telephone No. 1 wishes to talk to the subscriber at telephone No. 3. He first turns the crank-arm 30 three spaces on the cover A of the box B, which spaces may be conveniently marked 1 2 3, &c. He then removes the receiver R from the hook 60 and turns the crank 30 back into contact with 29. This gives the crank C three revolutions and plunges the pitman 1 three times into the mercury 2. The current then flows from ground G through 15, 2, 1, base A', 3, 3ᵃ, 4, 5, 6, M⁸, 9, 10, battery 12 to ground G at the central. This current is repeated as many times as the pitman 1 comes in contact with the mercury 2, and each time it energizes the magnet M⁸ and causes the pointer P to move one space. Under the assumption that there were three contacts the pointer P of the switch connected to telephone No. 1 (which is the one calling) would be on contact Q³, which is connected to the conductor 83, which in turn is connected to the normal of telephone No. 3. The subscriber at telephone No. 1 then pushes in and turns his crank K, which makes the connection between 17 and 18 and generates a current that flows from F (see Fig. 1) through 17, 18, 28, 29, 30, A', 3, 3ᵃ, 4, 5, line 6 from telephone No. 1, (see Fig. 7,) M⁸, 9, a, 10, aaa, line 9, (of the switch for telephone No. 3,) M³, line 6 to telephone No. 3, 5, (see Fig. 1 again,) 4, 36ᵃ, (receiver still being on at telephone No. 3,) 36, 25, 24, 23, 22, 21, 20, 19, 31 (see Fig. 7) to 62 of switch for telephone No. 3, 61, L³, framework L to pointer P, Q, 83, Q³ of switch for telephone No. 1, P, L, L³, 61, 62, 31 to 19 of telephone No. 1, 20, 21, 22, 23, 24, 25, 26, 27 and back to the beginning in generator F of telephone No. 1. This rings the bell at telephone No. 3 and calls the subscriber without connecting to or disturbing any of the other telephones. The subscriber at telephone No. 3 then removes his receiver, when the talking-circuit goes over the same course as the ringing-circuit except that in each telephone instead of going through 23, 24, 25, 26, 27, F and 17 to 18 it goes from 22 to the secondary 37, 38, R, 39, 39ᵃ and 40 to 18. The primary circuit goes from 52, through 53, 53ᵃ, 36, 36ᵃ, 50, 50ᵃ, 51 to 52.

When the subscriber at telephone No. 1 hangs up his receiver, the pin 54 depresses the lever 55 and makes a contact between 56 and 20 and also between 57 and 59. The current then flows from ground G at telephone No. 1 through 59, 57, 55, 60, 5, 6, M⁸, 9, 10, 12 to ground G at central, and simultaneously with this another current flows from ground G at telephone No. 1 through 59, 57, 55, 56, 20, 19, 31, 62, 66, 64, 11, 9, 10, 12 to ground G at central. The first of these circuits closes the connection between 62 and 66, and the second in passing through magnet 64 lifts the arm N from engagement with the crown-teeth of the wheel L² and permits the spring P' to return the pointer P to its normal position. As the contact between 57 and 59, and also between 56 and 20, is broken instantly after being made by the lever 55 slipping off of the pin 54 when the hook 60 is at its lowest position, it is evident that when the receiver R is hung upon the hook 60 all parts return instantly to normal condition and are ready for the next call. The currents closed to ground through battery 12 operate magnet $M^8$ and move the pointer P, but the current from the generator F and the secondary current through the induction-coil are not powerful enough to do so, and may consequently pass over the line going through the said magnet without disturbing the switch.

It will be observed that each telephone has the normal of its switch connected to a different conductor. Consequently when any subscriber wishes to talk to another he simply moves his own switch into connection with that particular conductor, and thus obtains the proper connections without disturbing any other subscriber. If he finds that the one he calls is already talking, he can hang up his receiver and disconnect his own line without disturbing anybody. It will also be observed that when the receiver is on its hook $3^a$ and 4 are disconnected, and consequently that the lever 30 can be turned any amount without sending a current over the line 3, also that the lever 30 should be in contact with 29 at all times except when being turned, so that the current may pass over line 28. Therefore for any subscriber to call any other one, as No. 37, he first moves the lever 30 to the point D that is marked "7" on it and then removes the receiver. He then moves the lever 30 to contact with 29, which gives him seven steps with his pointer P, and follows this by making three complete revolutions of the lever 30, (each time passing under the lip $29^a$,) stopping it in contact with 29. This gives him thirty more steps of his pointer P, which, added to the previous seven, gives thirty-seven.

What I claim is—

1. A contact-closing device consisting of a crank, a pitman connected thereto, an electrical connection with which said pitman makes a contact once during each revolution of said crank, a device connected to said crank and adapted to draw it to and hold it at a position where said pitman will not be in electrical contact, and connections between said crank and a crank-arm for permitting said first-mentioned crank to be turned by hand.

2. In a circuit-closing device, a crank, a pitman connected thereto, a mercury-receptacle into which said pitman is thrust by said crank, means for causing said crank to stop at a fixed position, and connections for permitting said crank to be rotated by hand.

3. In combination with a circuit-closing device consisting of a crank, a pitman, and a mercury-receptacle into which said pitman is thrust by said crank, a hand-lever, and connections between said hand-lever and said crank for giving said crank a rapid revolution.

4. In combination with a telephone, a mercury-receptacle, a pitman adapted to be thrust into said receptacle by a crank, a crank for so thrusting it, devices for turning said crank by hand, a bell-ringing device located at a distant telephone, and connections from said receptacle and said pitman to said bell-ringing device.

5. A receiver-hook provided with a pin, a flexible lever adjacent thereto and provided with a curved or inclined part for permitting said pin to pass said lever when moving in one direction by bending it but to engage and move said lever when moving in the other direction, and means for disengaging said lever from said pin when moved a required distance.

6. A circuit-closing device consisting of a mercury-receptacle and a pitman adapted to be thrust therein, a crank-arm adapted to be rotated about a pivot and provided with connections for operating said circuit-closing device, a stop in the path of said crank-arm at its normal position and against which it is normally held, and electrical connections whereby a circuit may be completed from the support for said crank-arm through said mercury-receptacle when said arm is being rotated and from said support through said stop when said arm is in normal position.

7. A circuit-closing device operated by the rotations of an arm about its pivot, a stop in the path of said arm against which it is normally and automatically held, a bell-ringing generator, a pointer located at a distant station and adapted to be rotated about a pivot, a magnet for moving said pointer into successive contact with a series of insulated points, electrical connections from said contact-closing device to said magnet, a separate connection from said stop through said generator to said pointer, and a series of connections from said insulated points to a series of telephones.

8. A ratchet-wheel mounted upon a spindle, devices for turning said wheel step by step, means for connecting and disconnecting said wheel and spindle, a spring for returning said spindle to normal position when released, a pointer carried by spindle, a series of insulated contact-points in the path of said pointer, connections from a telephone to said pointer, and means for controlling the movement of said pointer from said telephone.

9. A ratchet-wheel loosely mounted on a spindle, a magnet and pawl for turning said wheel step by step, means for connecting and disconnecting said wheel and spindle, a spring for returning said spindle to a normal position when released from said wheel, a pointer carried by said spindle, a series of insulated contact-points over which said pointer sweeps and into electrical contact with which it comes, connections from a telephone to said magnet and to one of said contact-points, connections from each of the other contact-points to a different telephone, and means for enabling the subscriber at the first-mentioned telephone to operate said magnet so as to move the said pointer into electrical connections with any one of said other telephones.

10. A ratchet-wheel loosely mounted on a spindle, spur ratchet-teeth on said wheel by which it receives and crown ratchet-teeth by which it transmits motion, a magnet and connections for turning said wheel, a stationary pawl for holding it, an arm secured to said spindle and provided with a lug for engaging said crown-teeth, a second magnet and connections for raising said arm to release it from said wheel, a spring for returning it to normal position when so released, and a second spring for returning it to engagement with said wheel when returned to normal position.

11. A ratchet-wheel, a magnet and devices for causing it to turn in one direction only, an arm mounted on the axis of said wheel and arranged to turn in two directions, means for engaging said arm to and disengaging it from said wheel, a series of contact-points connections to which are closed in succession when said arm is rotated by said wheel, and means for controlling said operations from a distant telephone.

12. A circuit-closing device and a stop for holding it open, a bell-ringing generator, a pointer and a series of insulated points, a magnet for moving said pointer into successive contact with said points, connections from the circuit-closing device to said magnet, separate connections from said stop through said generator to said pointer, and a series of connections from said insulated points to a series of telephones.

13. An arm movable about a pivot, a circuit-closing device, connections between said arm and said circuit-closing device for operating the latter rapidly by the movement of the former, a series of fixed points in the path of said arm each one representing a position in which said circuit-closing device is open, a spring the tension of which is exerted to stop said arm at said points, a second circuit-closing device closed by said arm when stopped at its normal position, connections from the first-mentioned circuit-closing device to mechanism for making electrical connections between a given telephone and any one of a series of other telephones, and connections from the second circuit-closing device to the calling mechanism of the selected telephone.

14. A ratchet-wheel loosely mounted on a spindle, spur-teeth on said wheel by which it receives and crown-teeth by which it transmits motion, means for turning said wheel in one direction only, means for engaging said spindle to and disengaging it from said wheel, a spring for returning said spindle to a normal position when disengaged from said wheel, and means for controlling said operations from a distance.

15. A series of contact-points, a pointer adapted to be moved into successive contact with said points, a ratchet-wheel connected to said pointer, devices for turning said wheel in one direction and preventing its turning in an opposite direction, means for disengaging said pointer from said wheel, a spring for moving said pointer in an opposite direction when disengaged, and a stop for said pointer at its normal position.

16. A flexible and resilient arm adapted to be rotated about a pivot and to operate a circuit-closing device a successive number of times during each revolution, a stop against which said arm rests when in normal position, an opening in said stop for permitting said arm to pass when depressed, and electrical connections from said stop and also from the support of said arm whereby said arm and stop form part of an electric circuit when said arm is in normal position.

17. A circuit-closer, an arm for operating it, a spring for stopping said arm at positions that will leave said circuit-closer open, a second circuit-closer closed by said arm when stopped at its normal position, a pointer and a series of insulated contact-points, connections from each contact-point to a different telephone, a magnet for moving said pointer into successive contact with said points, and connections from the first circuit-closer to said magnet and from the second circuit-closer to said pointer.

18. A circuit-closing device, an arm for operating it, a second circuit closed by said arm when in its normal position, a third circuit-closer operated by the receiver-hook of a telephone, a bell-ringing generator, a pointer and a series of insulated contact-points, a magnet for moving said pointer into successive contact with said points, connections from each point to a different telephone, connections from the first circuit-closer and through the third to said magnet, and separate connections from the second circuit-closer through said generator to said pointer.

19. A circuit-closing device consisting of a crank having a pitman adapted to be thrust into a cup of mercury once during each revolution of said crank, a spring arranged to hold said pitman normally from contact with said mercury, a revoluble arm and connections for giving said crank a number of revolutions for each revolution of said arm, and indicating-marks in the path of said arm for showing the number of times that said circuit-closing device is operated.

20. A circuit-closer operated by the rotation of an arm about its pivot, a second circuit-closer closed by said arm when at its normal position, a selecting device for making connections from a pointer to any one of a series of telephones, connections from the first-mentioned circuit-closer to the selecting device, a separate connection from the second circuit-closer through a telephone-receiver to said pointer and thence to the selected telephone, a bell-ringing generator, a crank for turning it, and means connected therewith for breaking connection through the receiver and completing it through said generator.

21. A series of telephones connected to a series of contact-points, a pointer adapted to be moved by successive steps into electrical connection with said contact-points, a magnet for so moving it, connections from said magnet to a circuit-closing device operated by the receiver-hook of a telephone, means whereby said circuit-closing device will be open when said hook is depressed and closed when elevated, connections from said circuit-closing device to a second circuit-closer for completing a circuit through said magnet when the first-mentioned circuit-closing device is closed, an arm for operating said second circuit-closer and adapted to be moved by hand over the face of a dial, and distinguishing-marks on the face of the dial for indicating the number of times said second circuit-closer has completed a circuit through the magnet for moving said pointer.

22. A series of electrical contact-points, a pointer adapted to be moved into successive contact with said points, a magnet and connections for moving said pointer by successive steps from one point to the next, a spring for returning said pointer to normal position when released from its propelling mechanism, a second magnet and connections for causing such release, a circuit-closing device operated by a crank for making connections to said first-mentioned magnet, an arm and connections for turning said crank, indicating-points in the path of said arm for showing the number of times said circuit-closing device is operated, a telephone-receiver and a hook for supporting it, a lever adjacent to said hook and arranged to be moved and released by the descent of said hook, and means whereby the movement of said lever will close the circuit through said second magnet and cause the release of said pointer from its propelling and holding mechanism.

23. In combination with a switching mechanism provided with propelling and releasing devices, connections from each device to a telephone, a circuit-closer located in the connection to one device and operated by the other device, contact-terminals on each connection at the telephone, a second circuit-closer adapted to make simultaneous contact with both terminals, a receiver-hook, and means for operating said second circuit-closer by the movement of said hook.

24. A ratchet-wheel, devices for moving it intermittently in one direction and preventing its return, a pointer carried by said wheel, means for releasing said pointer from said wheel and returning it to normal position when so released, a series of insulated contact-points in the path of said pointer, connections from a telephone to one of said contact-points and to said propelling and releasing mechanisms, connections from each of the other contact-points to a different telephone, and means for enabling the subscriber at the first-mentioned telephone to operate the propelling and releasing devices to move said pointer into connection with any one of said telephones and to return it to normal position.

25. A propelling mechanism arranged to turn in one direction, devices for preventing it from turning in an opposite direction, a pointer, means for connecting said pointer to and releasing it from said propelling mechanism, a spring for returning it to normal position when released, connections from the propelling and releasing mechanisms to a telephone, a circuit-closing device located at said telephone and operated by hand for controlling said propelling mechanism, and a second circuit-closing device operated by the weight of a telephone-receiver for controlling said releasing mechanism.

26. A pointer and an electrically-operated propelling mechanism therefor, a magnet for releasing said pointer from its propelling mechanism, separate connections from said magnet and said propelling mechanism to a telephone, a circuit-closer located in the line to said magnet and operated by said propelling mechanism, a second circuit-closer adapted to make simultaneous contacts with each of said connections, a movable receiver-hook, and means for operating said second circuit-closer by the movement of said hook.

27. A magnet, a ratchet-wheel and a circuit-closer operated by said magnet, a pointer carried by said wheel, a second magnet for releasing said pointer from said wheel and provided with connections to said circuit-closer, separate connections from said first-mentioned magnet and from said circuit-closer to a telephone, and means operated by the weight of a receiver for sending simultaneous electrical impulses over each of the connections to said telephone.

28. A ratchet-wheel, a magnet and pawl for turning it, a second pawl for holding it, a pointer adapted to engage and be turned by said ratchet-wheel, a second magnet for releasing such engagement, a spring for returning said pointer to normal position when so released, connections from each magnet to a telephone, a circuit-closer located in the connection to one magnet, said circuit-closer being normally open but closed by the movement of the other magnet, a second closer located at the telephone and adapted to make simultaneous electrical contact to both connections, a movable receiver-hook, and means for operating said second circuit-closer by the movement of said hook.

29. A pointer and a ratchet-wheel for moving it, a magnet for turning said wheel, a second magnet for releasing said pointer from said wheel, connections from each of said magnets to a telephone, a circuit-closer operated by a crank for sending a current through the propelling-magnet, and separate circuit-closers operated by the weight of a receiver for sending simultaneous currents through both magnets.

FRANK A. LUNDQUIST.

Witnesses:
   N. E. NORSTROM,
   E. C. WICKERSHAM.